US012693929B2

(12) United States Patent　　　　(10) Patent No.:　US 12,693,929 B2
Telkar et al.　　　　　　　　　　　　(45) Date of Patent:　Jul. 28, 2026

| | | | | | |
|---|---|---|---|---|---|
| (54) | INTELLIGENT TEST DATA TROUBLESHOOTING IN ERP SYSTEMS | 11,734,299 B2 * | 8/2023 | Alavi | G06F 16/258 |
| | | | | | 707/756 |
| | | 12,407,581 B1 * | 9/2025 | Vasseur | H04L 41/046 |
| (71) | Applicant: SAP SE, Walldorf (DE) | 12,541,413 B2 * | 2/2026 | Tamm | G06F 11/0769 |
| | | 2004/0187048 A1 * | 9/2004 | Angamuthu | H04L 41/0645 |
| (72) | Inventors: Prashant Telkar, Bangalore (IN); | | | | 714/E11.026 |
| | Shubham Saklani, Bangalore (IN) | 2016/0246667 A1 * | 8/2016 | Kumar Rao | G06F 11/0793 |
| | | 2017/0104650 A1 * | 4/2017 | Tee | H04L 51/216 |
| (73) | Assignee: SAP SE, Waldorf (DE) | 2017/0161132 A1 * | 6/2017 | Tee | G06F 11/076 |
| | | 2019/0205195 A1 * | 7/2019 | Tee | G06F 16/285 |
| ( * ) | Notice: Subject to any disclaimer, the term of this | 2020/0133823 A1 * | 4/2020 | Kumar | G06F 11/006 |
| | patent is extended or adjusted under 35 | 2024/0070570 A1 * | 2/2024 | Bindal | G06Q 10/0631 |
| | U.S.C. 154(b) by 53 days. | 2024/0126631 A1 * | 4/2024 | Tamm | G06F 11/0769 |

(Continued)

(21) Appl. No.: 18/902,467

OTHER PUBLICATIONS

(22) Filed: Sep. 30, 2024

OpenAI Platform, "Embeddings," https://platform.openai.com/docs/guides/embeddings, 1 page (accessed Aug. 30, 2024).

(65) Prior Publication Data

(Continued)

US 2026/0093574 A1　　Apr. 2, 2026

*Primary Examiner* — Jonathan D Gibson

(51) Int. Cl.
G06F 11/07　　　　(2006.01)
G06F 16/334　　　(2025.01)

(74) *Attorney, Agent, or Firm* — Klarquist Sparkman, LLP

(52) U.S. Cl.
CPC ...... G06F 11/0793 (2013.01); G06F 11/0766 (2013.01); *G06F 16/3347* (2019.01)

(57) ABSTRACT

A computer-implemented method for improving test data troubleshooting in an enterprise resource planning (ERP) system is disclosed. The method can receive an error message generated by an application programming interface of the ERP system when processing a set of test data, embed the error message into a message vector, search a vector database comprising a plurality of object vectors to identify a target object vector matching the message vector, retrieve a target object document associated with the target object vector, and generate an answer including instructions to modify the set of test data based on the error message and the target object document. Related systems and software for implementing the method are also disclosed.

(58) Field of Classification Search
CPC . G06F 11/079; G06F 11/0793; G06F 11/0751
See application file for complete search history.

(56) References Cited

U.S. PATENT DOCUMENTS

| | | | | |
|---|---|---|---|---|
| 7,900,094 B2 * | 3/2011 | Marinucci | G06F 11/366 | |
| | | | 714/48 | |
| 11,314,574 B2 * | 4/2022 | Handa | G06F 11/0778 | |
| 11,709,726 B2 * | 7/2023 | Alavi | G06F 11/0775 | |
| | | | 714/37 | |

17 Claims, 5 Drawing Sheets

(56)          References Cited

U.S. PATENT DOCUMENTS

| | | | |
|---|---|---|---|
| 2025/0053740 A1* | 2/2025 | Vaidyanathan | G06F 40/284 |
| 2025/0147832 A1* | 5/2025 | Agrawal | G06F 11/0706 |
| 2025/0147947 A1* | 5/2025 | Oattes | G06F 16/2452 |
| 2025/0362665 A1* | 11/2025 | Koziolek | G05B 19/4184 |
| 2026/0017137 A1* | 1/2026 | Dasari | G06F 11/0709 |

OTHER PUBLICATIONS

"Explaining Data Objects," https://learning.sap.com/learning-journeys/developing-business-processes-with-sap-process-orchestration/explaining-data-objects_d544c7a1-02f8-416 . . . , 8 pages (accessed Aug. 30, 2024).

Langchain, "Text Splitters," https://python.langchain.com/v0.1/docs/modules/data_connection/document_transformers/, 5 pages (accessed Aug. 29, 2024).

W3 Schools, "Pandas DataFrames," https://www.w3schools.com/python/pandas/pandas_dataframes.asp, 11 pages (accessed Aug. 5, 2024).

AWS, "What is RAG (Retrieval-Augmented Generation)?," https://aws.amazon.com/what-is/retrieval-augmented-generation/, 9 pages (accessed Jul. 24, 2024).

* cited by examiner

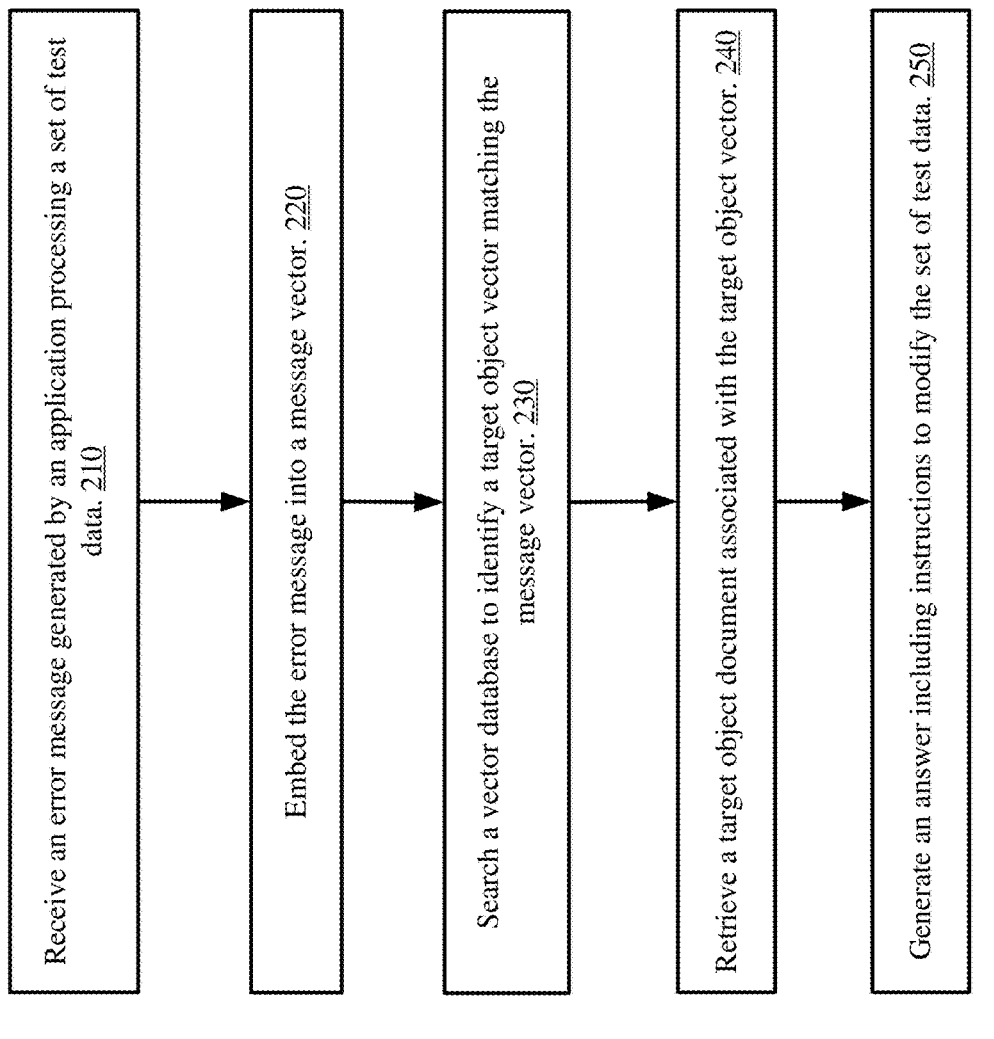

Receive an error message generated by an application processing a set of test data. 210

Embed the error message into a message vector. 220

Search a vector database to identify a target object vector matching the message vector. 230

Retrieve a target object document associated with the target object vector. 240

Generate an answer including instructions to modify the set of test data. 250

INTELLIGENT TEST DATA TROUBLESHOOTING IN ERP SYSTEMS

BACKGROUND

Enterprise Resource Planning (ERP) systems are comprehensive software solutions that manage and integrate a company's financials, supply chain, operations, reporting, manufacturing, and human resource activities. Using test data in ERP systems is crucial for developing and validating software applications, as well as for demonstrating these applications to customers. However, errors in test data can create significant problems, as they often lack clarity and context, making it difficult for business representatives, testers, and developers to identify and resolve issues efficiently. As a result, valuable resources can be spent on manual investigation and troubleshooting, diverting resources from other critical tasks. Thus, room for improvements exists for improving test data troubleshooting process.

BRIEF DESCRIPTION OF THE DRAWINGS

FIG. 2 is a flowchart illustrating an example overall method for improving test data troubleshooting in an EPR system.

DETAILED DESCRIPTION

Figure 1:
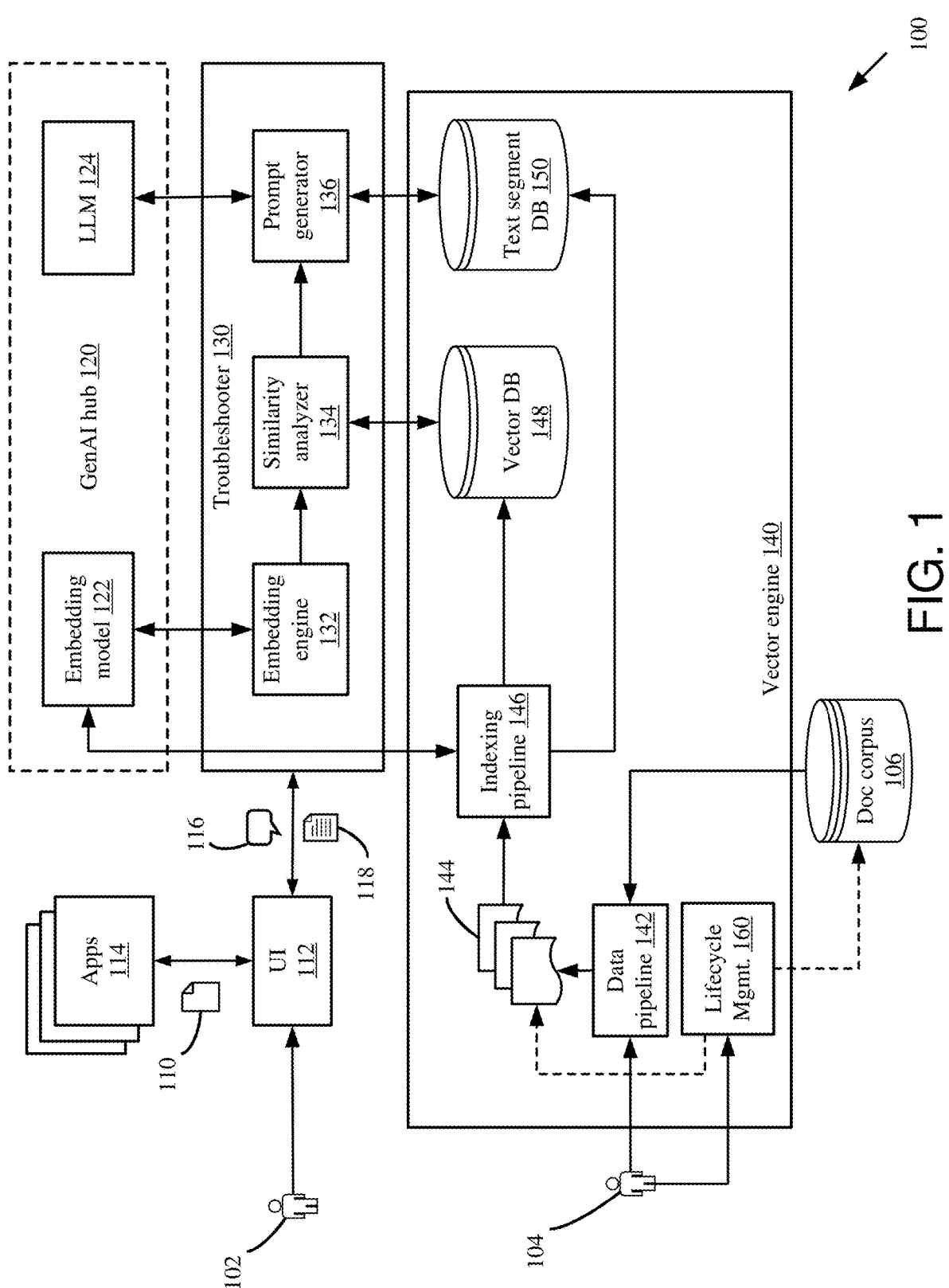
FIG. 1 is an overall block diagram of an example ERP system supporting intelligent test data troubleshooting.

Overview of Test Data Troubleshooting in ERP Systems

ERP is software that allows an organization to use a system of integrated applications to manage their business and automate many back-office functions related to technology, services and human resources.

In ERP systems, test data plays a crucial role in various business environments. For example, in test automation within Continuous Integration/Continuous Deployment (CI/CD) pipelines, test data can be used to simulate real-world scenarios to validate the functionality and performance of ERP systems. This ensures that new code changes do not introduce errors and that the system behaves as expected under various conditions. As another example, when showcasing applications to potential customers, realistic test data helps demonstrate the application's capabilities and how it can handle actual business processes.

Test data typically includes both master data and transaction data. Master data is generally stable and does not change as often as transaction data. Master data provides essential information about entities, objects, or elements used in business processes, while transaction data records the actual business activities and events. For instance, master data may include data objects representing business partner records, employee records, product data, supplier data, customer data, etc. Transaction data may include data objects containing details of individual transactions or operations, such as products bought, quantities, prices, etc.

As described herein, a data object is a structured entity used to store, manage, and manipulate specific pieces of information within a business system, typically encompassing attributes like type, length, and associated metadata to ensure consistent data processing and integration across different functions. Test data can be large and may include thousands or even millions of data objects.

However, creating reliable test data can be challenging, as the created test data can cause errors when consumed by applications during test automation, product demos, or other scenarios. These errors often stem from incomplete or inconsistent data sets, incorrect data formats, or issues with data integrity. For instance, a person might introduce errors when creating a data object by entering incorrect values, omitting necessary fields, or using inconsistent naming conventions. Further, test data may come from different sources, with various people creating different data objects. For example, one team might generate customer data, while another team creates product data, and yet another is responsible for sales order data. This decentralized approach for test data generation can lead to discrepancies and mismatches, further complicating the troubleshooting process when errors arise. Ensuring that all data objects are correctly aligned and compatible is crucial for maintaining the integrity and reliability of the test data. But when test data is extensive, the complexity of ensuring data reliability increases significantly, making errors inevitable and more challenging to identify and rectify.

Troubleshooting errors caused by test data presents significant technical challenges and can have a negative impact on the overall efficiency of ERP systems. The difficulties arise from the lack of clarity and context in the error messages provided by the applications or application programming interfaces (APIs) that consume the test data. These messages often lack sufficient detail or are presented in technical jargon, making it challenging for business representatives, testers, and developers to pinpoint the exact cause of the issue. This ambiguity can lead to prolonged troubleshooting times, as teams may need to manually investigate and communicate with multiple stakeholders to resolve the issues. The impact of these errors is particularly pronounced in CI/CD pipelines, where delays in identifying and fixing test data issues can slow down the entire development and deployment process. As another example, errors in test data can disrupt product demos, leading to poor customer experiences and potentially affecting sales.

The technologies described herein address the above challenges by implementing a cloud-based generative artificial intelligence (AI) service to analyze error messages, identify root causes, and provide actionable insights for resolution. By accurately interpreting complex error messages and offering proactive recommendations for corrective actions, the disclosed solution can streamline the troubleshooting process and enhance the overall efficiency and effectiveness of ERP systems.

Example ERP System Supporting Intelligent Test Data Troubleshooting

FIG. 1 shows an overall block diagram of an example ERP system 100 configured to support intelligent test data troubleshooting.

The ERP system 100 includes an intelligent troubleshooter 130 and a vector engine 140, both of which can be deployed as cloud-based software applications. As described more fully below, the vector engine 140 can be configured to create and maintain a vector database 148 and a text segment database 150. Both databases can be created in a design phase. The troubleshooter 130, on the other hand, can be used during a runtime phase by an end user to diagnose and resolve test data related errors within the ERP system 100.

During runtime, through a user interface, or UI 112, a user 102 can deploy a set of test data 110 onto one or more applications 114 of the ERP system 100. As described above, the applications 114 may throw errors when consuming the test data 110 and generate corresponding error messages 116. The error messages 116 can be analyzed by the troubleshooter 130, which is configured to identify root causes of the errors and provide actionable insights for resolution. For example, in response to a received error message 116, the troubleshooter 130 can generate an answer (e.g., in plain text) including instructions to modify the set of test data 110 so as to resolve the corresponding errors.

A generative AI hub 120 can be used provide generative AI capabilities to the ERP system 100. In some examples, the generative AI hub 120 can be hosted externally (e.g., on a third-party platform). In other examples, the generative AI hub 120 can be deployed locally on the ERP system 100. The generative AI hub 120 can include an embedding model 122 and a large language model, or LLM 124. The embedding model 122 is configured to transform input text into a dense vector representation that captures semantic meaning of the input text. Example embedding model 122 can be text-embedding-ada-002, Bidirectional Encoder Representations from Transformers (BERT), FastText, Word2Vec, GloVe, or the like. The LLM 124 is configured to generate natural language text or responses based on input prompts. Example LLM 124 can be Generative Pre-trained Transformer (GPT) or BERT-based models, or the like. Although in the depicted examples the embedding model 122 and LLM 124 are shown as two different units, in other examples, the embedding model can be a component of the LLM.

The troubleshooter 130 can include an embedding engine 132, a similarity analyzer 134, and a prompt generator 136. The embedding engine 132 can utilize the embedding model 122 to map words or phrases from an error message 116 to a multi-dimensional vector of real numbers. As a result, the embedding engine 132 can convert or embed the error message 116 into a message vector which captures semantic and syntactic relationships between words of the error message 116.

The similarity analyzer 134 is configured to search the vector database 148 containing a plurality of object vectors. The searching can identify, among the plurality of object vectors, a target object vector matching the message vector. In some examples, the similarity analyzer 134 is configured to measure similarities between the message vector and the plurality of object vectors. An example similarity measurement can be cosine similarity, which quantifies the cosine of the angle between two vectors. A high cosine similarity indicates a smaller angle and hence a higher degree of semantic similarity between two vectors. The similarity analyzer 134 can be configured to rank the object vectors based on their cosine similarity scores relative to the message vector. The target object vector can be determined as the one with the highest cosine similarity score, indicating it is the closest match in terms of semantic content. In cases where multiple object vectors have similar scores, additional criteria, such as contextual relevance or predefined thresholds, may be applied to refine the selection of the target object vector.

The prompt generator 136 is configured to automatically generate a prompt based on a prompt template and send the prompt to the LLM 124. In response, the LLM 124 can generate a reply, which can be formatted by the troubleshooter 130 and presented as the answer 118 on the UI 112.

The prompt template can include specific instructions for the LLM 124 to find relevant solutions to resolve the error corresponding to the error message 116. The prompt template can include one placeholder for the error message 116 and another placeholder which can be replaced with context retrieved from the text segment database 150. This context contains textual information corresponding to the target object vector.

In some examples, a target object document (which is one of the object documents 144 described below) can be identified. The target object document contains a text segment (also referred to as "target text segment") associated with the target object vector—specifically, the one with the maximum similarity score determined by the similarity analyzer 134. In some examples, the target object document can include multiple text segments. For instance, the target text segment may contain a partial description of an error message, but the full description of the error message spreads across multiple text segments. In that scenario, the multiple text segments can be merged into the target object document to provide a comprehensive representation of the error message. This target object document can include detailed descriptions, explanations, or potential solutions related to the error message 116. In some examples, the entire target object document can be provided as the context in the prompt template. In some examples, selected sections (e.g., the "Resolution" section of an error handling guide document can be extracted and used as context.

Including the context and error message in the prompt provides the LLM with additional relevant details that enhance its understanding of the error within a specific domain or system environment, thereby improving the accuracy and relevance of the generated response. In other words, by incorporating this context, the LLM 124 can tailor its reply to the specific nuances and requirements of the situation, leading to more effective troubleshooting and problem resolution.

Both the vector database 148 and text segment database 150 can be created in the design phase and maintained by the vector engine 140. In some examples, an administrator 104 can configure a data pipeline 142 to ingest data from a document corpus 106. The document corpus 106 can include a comprehensive repository of technical documents related to the ERP system 100, such as API descriptions, data object definitions, troubleshooting documents, help documents, notes, wiki pages, and other relevant materials. The data pipeline 142 can be configured to extract, from the document corpus 106, a plurality of object documents 144. Thes extracted object documents 144 represent a subset of the document corpus 106, containing the most relevant and contextually appropriate information of data objects in the test data 110.

In some examples, the administrator 104 can configure the data pipeline 142 to automatically extract data from the document corpus 106 by selecting data sources and applying one or more rule-based filters. These filters can include keyword searches within specific fields (e.g., title, summary) and/or specific sections (e.g., "Error Messages" or "Troubleshooting" sections of some technical documents), metadata filtering based on attributes like document type, author, creation date, tags, and other rules that refine the selection of documents. In some examples, documents can be automatically categorized using machine learning models pretrained to recognize content categories or through predefined rules based on document attributes. For instance, documents could be categorized into "Error Resolution," "Installation Guides," etc., based on their content and structure. Suppose you're looking for documents related to a specific SAP error.

As one specific example, the data pipeline 142 can start the data ingestion process with a keyword search for "SAP Error Code XYZ" across technical guides, filtering results by creation date (e.g., within the last two years) and document type (e.g., troubleshooting guides). Then, categorization can help in identifying the most relevant sections within these documents, automatically directing the search to the "Error Resolution" sections where the error message is likely to be discussed.

The vector engine 140 includes an indexing pipeline 146 which is configured to convert the object documents 144 into object vectors stored in the vector database 148 and segmenting these documents into smaller portions stored in the text segment database 150. In some examples, the indexing pipeline 146 can divide each object document 144 into smaller text segments, which can be defined by a predetermined length of text (e.g., number of tokens). Additionally, a predefined overlap between adjacent text segments can be introduced to ensure continuity of context across text segments. This segmentation approach can be applied uniformly across different document types, including spreadsheets, PDFs, Word documents, XML files, or the like. Each document type can be parsed according to its structure. For example, spreadsheets can be segmented by rows or cell ranges, PDFs and Word documents by paragraphs or sections, and XML files by specific nodes or tags, etc. The segmentation process ensures that even complex or lengthy documents are broken down into manageable pieces, facilitating accurate embedding and retrieval.

Once the object documents 144 are segmented, each text segment can be processed using the embedding model 122, which converts the text segment into a multi-dimensional vector representation, also referred to as an "object vector" hereinafter. These object vectors capture the semantic meaning of the text segments and are stored in the vector database 148. The corresponding text segments, along with any relevant metadata, can be stored in the text segment database 150. As described above, the vector database 148 and text segment database 150 can be used for efficient retrieval and matching during runtime, enabling the troubleshooter 130 to quickly identify and utilize relevant context information (e.g., based on vector similarity) for prompting the LLM 124.

In some examples, the vector engine 140 can further include a lifecycle management unit 160 which is configured to ensure that the vector database 148 and text segment database 150 are kept up to date with the most current information. The administrator 104 can configure the lifecycle management unit 160 to monitor changes in the document corpus 106, ensuring that important updates to the documents in the document corpus 106 can be timely reflected in the object documents 144, which in turn affects the content of the vector database 148 and text segment database 150. Additional details of the lifecycle management unit 160 and its operations are described further below.

In practice, the systems shown herein, such as the ERP system 100, can vary in complexity, with additional functionality, more complex components, and the like. For example, there can be additional functionality within the troubleshooter 130 and/or the vector engine 140. Additional components can be included to implement security, redundancy, load balancing, report design, data logging, and the like.

The described computing systems can be networked via wired or wireless network connections, including the Internet. Alternatively, systems can be connected through an intranet connection (e.g., in a corporate environment, government environment, or the like).

The ERP system 100 and any of the other systems described herein can be implemented in conjunction with any of the hardware components described herein, such as the computing systems described below (e.g., processing units, memory, and the like). In any of the examples herein, error messages, embedding vectors, prompts, text segments, and the like can be stored in one or more computer-readable storage media or computer-readable storage devices. The technologies described herein can be generic to the specifics of operating systems or hardware and can be applied in any variety of environments to take advantage of the described features.

Example Lifecycle Management

In some examples, the lifecycle management unit 160 can be configured by the administrator 104 to periodically check the document corpus 106 for any changes. For example, the lifecycle management unit 160 can be set to perform these checks every day or at another regular interval. During these checks, the lifecycle management unit 160 evaluates whether there have been any additions, deletions, or modifications to the documents stored in the document corpus 106. If changes are detected, the lifecycle management unit 160 then controls the data pipeline 142 to extract relevant object documents 144 from the updated document corpus 106.

Alternatively, the lifecycle management unit 160 can be configured to operate the data pipeline 142 on demand, triggering data extraction only when changes occur in the document corpus 106. In this configuration, addition of a new document, deletion of an existing document, or modification to a newer version of an existing document in the document corpus 106 can automatically trigger the lifecycle management unit 160 to activate the data pipeline 142 for data ingestion.

It is important to note that not all changes in the document corpus 106 will necessarily result in changes to the object documents 144. As described above, the data pipeline 142 employs filtering mechanisms to extract relevant documents from the document corpus 106. If certain changes in the document corpus 106 are deemed irrelevant by these filters, the resulting object documents 144 may remain unchanged despite updates to the document corpus 106. Consequently, no updates to the vector database 148 and text segment database 150 would be necessary in such cases.

If updates to the document corpus 106 do result in changes to the object documents 144, the vector database 148 and text segment database 150 will be updated accordingly.

For example, if a new object document 144 is created, the indexing pipeline 146 will divide it into text segments, each of which will then be embedded into a corresponding object vector using the embedding model 122. These newly generated object vectors will be saved in the vector database 148, while the corresponding text segments will be added to the text segment database 150. Similarly, when an outdated object document 144 is deleted, the lifecycle management unit 160 will ensure that the associated text segments and their corresponding object vectors are removed from the text segment database 150 and vector database 148, respectively. In cases where an existing object document 144 is modified or replaced with a new version, the object document will be re-segmented, and each updated text segment will be re-embedded into new object vectors. The lifecycle management unit 160 will then replace the old object vectors in the vector database 148 with the new ones and refresh the corresponding text segments in the text segment database 150.

Thus, the lifecycle management unit 160 ensures that the vector and text segment databases consistently reflect the most current and accurate information. This ongoing maintenance enables the troubleshooter 130 to reliably retrieve and utilize relevant data, thereby enhancing its effectiveness in diagnosing and resolving issues related to the error message 116.

Example Overall Method for Improving Test Data Troubleshooting in ERP Systems FIG. 2 is a flowchart illustrating an example overall method 200 for intelligent test data troubleshooting in ERP systems. The method 200 can be performed, e.g., by the troubleshooter 130 of FIG. 1.

At step 210, the method can receive an error message (e.g., the error message 116) generated by an application of the ERP system when processing a set of test data.

At step 220, the error message can be embedded into a message vector (e.g., by the embedding engine 132 utilizing the embedding model 122).

At step 230, the method can search a vector database (e.g., the vector database 148) including a plurality of object vectors. The searching can identify, among the plurality of object vectors, a target object vector matching the message vector. As described above, the vector database can be created and maintained by a vector engine (e.g., the vector engine 140) based on a plurality of object documents extracted from a document corpus.

In some examples, searching the vector database includes measuring similarities (e.g., cosine similarities) between the message vector and the plurality of object vectors to quantify the degree of semantic alignment between the vectors. In some examples, searching the vector database further includes determining a maximum of the measured similarities. The target object vector, associated with this maximum similarity score, represents the object vector that is most closely aligned with the message vector in terms of their semantic content.

At step 240, the method can retrieve a target object document associated with the target object vector. The target object document can contain text descriptions of the error message, such as potential causes of the error, explanations of the error, and troubleshooting steps.

As described above, the target object document can be one of the object documents extracted from the document corpus. In some examples, the target object document can be identified to contain a text segment corresponding to the target object vector. This text segment can also be referred to as "target text segment." The target text segment can be retrieved from a text segment database (e.g., the text segment database 150) created and maintained be the vector engine.

Then at step 250, the method can generate an answer (e.g., the answer 118) including instructions to modify the set of test data based on the error message and the target object document.

In some examples, generating the answer includes generating a prompt based on a prompt template. The prompt template can include a first placeholder for receiving the error message and a second placeholder for receiving context from the target object document.

In some examples, generating the answer further includes prompting a large language model (e.g., the LLM 124) using the prompt.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example Overview of LLMs and Prompts

Generative AI models, foundation models, and LLMs are interconnected concepts in the field of AI. Generative AI, a broad term, encompasses AI systems that generate content such as text, images, music, or code. Unlike discriminative AI models that aim to make decisions or predictions based on input data features, generative AI models focus on creating new data points. Foundation models are a subset of these generative AI models, serving as a starting point for developing more specialized models. LLMs, a specific type of generative AI, work with language and can understand and generate human-like text. In the context of generative AI, including LLMs, a prompt serves as an input or instruction that informs the AI of the desired content, context, or task. This allows users to guide the AI to produce tailored responses, explanations, or creative content based on the provided prompt.

In any of the examples herein, an LLM can take the form of an AI model that is designed to understand and generate human language. Such models typically leverage deep learning techniques such as transformer-based architectures to process language with a very large number (e.g., billions) of parameters. Examples include the Generative Pre-trained Transformer (GPT) developed by OpenAI, Bidirectional Encoder Representations from Transforms (BERT) by Google, A Robustly Optimized BERT Pretraining Approach developed by Facebook AI, Megatron-LM of NVIDIA, or the like. Pretrained models are available from a variety of sources.

In any of the examples herein, prompts can be provided, in runtime, to LLMs to generate responses. Prompts in LLMs can be input instructions that guide model behavior. Prompts can be textual cues, questions, or statements that users provide to elicit desired responses from the LLMs. Prompts can act as primers for the model's generative process. Sources of prompts can include user-generated queries, predefined templates, or system-generated suggestions. Technically, prompts are tokenized and embedded into the model's input sequence, serving as conditioning signals for subsequent text generation. Experiment with prompt variations can be performed to manipulate output, using techniques like prefixing, temperature control, top-K sampling, chain-of-thought, etc. These prompts, sourced from diverse inputs and tailored strategies, enable users to influence LLM-generated content by shaping the underlying context and guiding the neural network's language generation. For example, prompts can include instructions and/or examples to encourage the LLMs to provide results in a desired style and/or format.

Example Architecture of LLM

Figure 3:
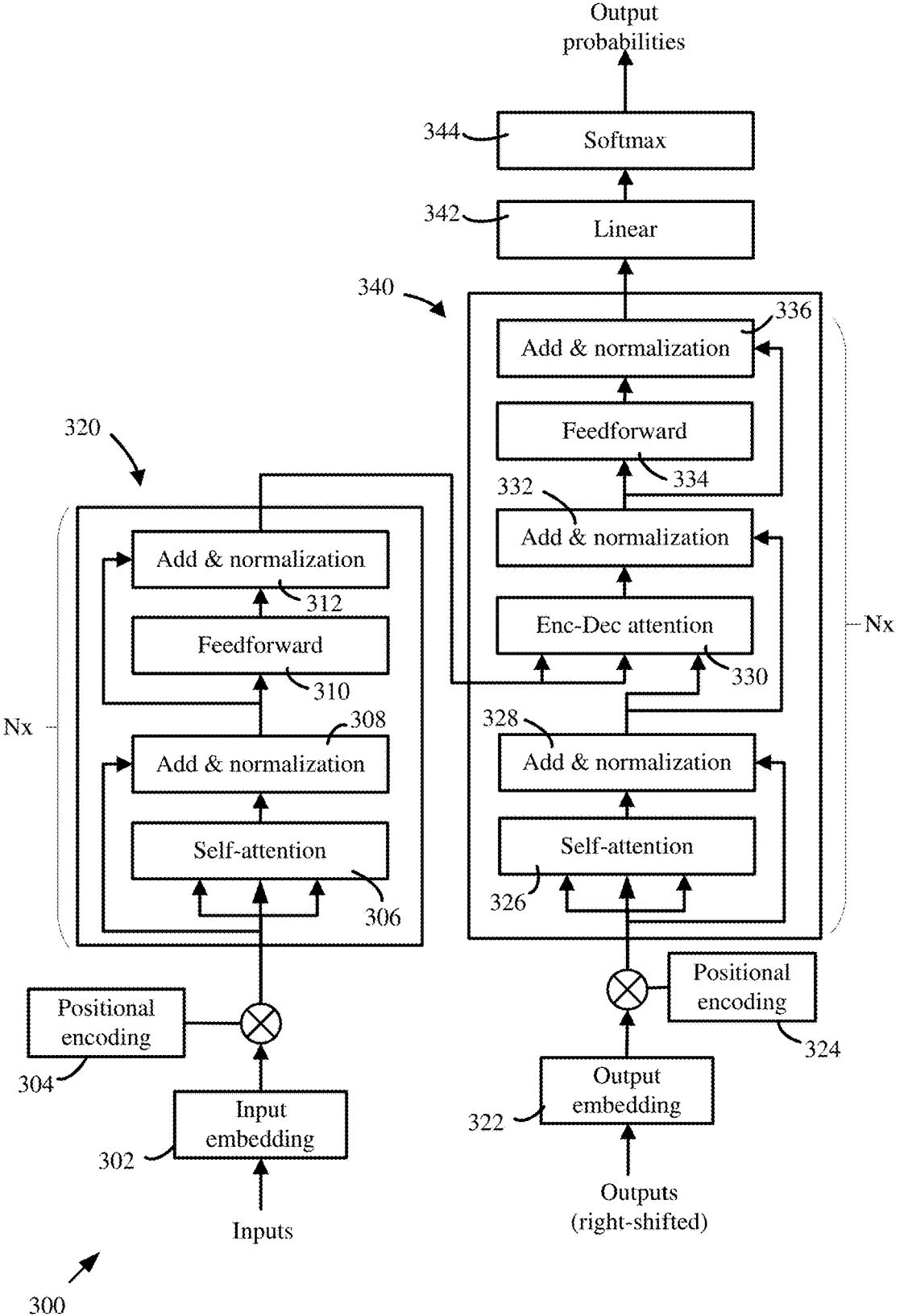
FIG. 3 is an architecture diagram of an example large language model.

FIG. 3 shows an example architecture of an LLM 300, which can be used as the LLM 124 of FIG. 1.

In the depicted example, the LLM 300 uses an autoregressive model (as implemented in OpenAI's GPT) to generate text content by predicting the next word in a sequence given the previous words. The LLM 300 can be trained to maximize the likelihood of each word in the training dataset, given its context.

As shown in FIG. 3, the LLM 300 can have an encoder 320 and a decoder 340, the combination of which can be referred to as a "transformer." The encoder 320 processes input text, transforming it into a context-rich representation. The decoder 340 takes this representation and generates text output.

For autoregressive text generation, the LLM 300 generates text in order, and for each word it generates, it relies on the preceding words for context. During training, the target or output sequence, which the model is learning to generate, is presented to the decoder 340. However, the output is right shifted by one position compared to what the decoder 340 has generated so far. In other words, the model sees the context of the previous words and is tasked with predicting the next word. As a result, the LLM 300 can learn to generate text in a left-to-right manner, which is how language is typically constructed.

Text inputs to the encoder 320 can be preprocessed through an input embedding unit 302. Specifically, the input embedding unit 302 can tokenize a text input into a sequence of tokens, each of which represents a word or part of a word. Each token can then be mapped to a fixed-length vector known as an input embedding, which provides a continuous representation that captures the meaning and context of the text input. Likewise, to train the LLM 300, the targets or output sequences presented to the decoder 340 can be preprocessed through an output embedding unit 322. Like the input embedding unit 302, the output embedding unit 322 can provide a continuous representation, or output embedding, for each token in the output sequences.

Generally, the vocabulary in LLM 300 is fixed and is derived from the training data. The vocabulary in LLM 300 consists of tokens generated above during the training process. Words not in the vocabulary cannot be output. These tokens are strung together to form sentences in the text output.

In some examples, positional encodings (e.g., 304 and 324) can be performed to provide sequential order information of tokens generated by the input embedding unit 302 and output embedding unit 322, respectively. Positional encoding is needed because the transformer, unlike recurrent neural networks, process all tokens in parallel and do not inherently capture the order of tokens. Without positional encoding, the model would treat a sentence as a collection of words, losing the context provided by the order of words. Positional encoding can be performed by mapping each position/index in a sequence to a unique vector, which is then added to the corresponding vector of input embedding or output embedding. By adding positional encoding to the input embedding, the model can understand the relative positions of words in a sentence. Similarly, by adding positional encoding to the output encoding, the model can maintain the order of words when generating text output.

Each of the encoder 320 and decoder 340 can include multiple stacked or repeated layers (denoted by Nx in FIG. 3). The number of stacked layers in the encoder 320 and/or decoder 340 can vary depending on the specific LLM architecture. Generally, a higher "N" typically means a deeper model, which can capture more complex patterns and dependencies in the data but may require more computational resources for training and inference. In some examples, the number of stacked layers in the encoder 320 can be the same as the number of stacked layers in the decoder 340. In other examples, the LLM 300 can be configured so that the encoder 320 and decoder 340 can have different numbers of layers. For example, a deeper encoder (more layers) can be used to better capture the input text's complexities while a shallower decoder (fewer layers) can be used if the output generation task is less complex).

The encoder 320 and the decoder 340 are related through shared embeddings and attention mechanisms, which allow the decoder 340 to access the contextual information generated by the encoder 320, enabling the LLM 300 to generate coherent and contextually accurate responses. In other words, the output of the encoder 320 can serve as a foundation upon which the decoder network can build the generated text.

Both the encoder 320 and decoder 340 comprise multiple layers of attention and feedforward neural networks. An attention neural network can implement an "attention" mechanism by calculating the relevance or importance of different words or tokens within an input sequence to a given word or token in an output sequence, enabling the model to focus on contextually relevant information while generating text. In other words, the attention neural network plays "attention" on certain parts of a sentence that are most relevant to the task of generating text output. A feedforward neural network can process and transform the information captured by the attention mechanism, applying non-linear transformations to the contextual embeddings of tokens, enabling the model to learn complex relationships in the data and generate more contextually accurate and expressive text.

In the example depicted in FIG. 3, the encoder 320 includes an intra-attention or self-attention neural network 306 and a feedforward neural network 310, and the decoder 340 includes a self-attention neural network 326 and a feedforward neural network 334. The self-attention neural networks 306, 326 allow the LLM 300 to weigh the importance of different words or tokens within the same input sequence (self-attention in the encoder 320) and between the input and output sequences (self-attention in the decoder 340), respectively.

In addition, the decoder 340 also includes an inter-attention or encoder-decoder attention neural network 330, which receives input from the output of the encoder 320. The encoder-decoder attention neural network 330 allows the decoder 340 to focus on relevant parts of the input sequence (output of the encoder 320) while generating the output sequence. As described below, the output of the encoder 320 is a continuous representation or embedding of the input sequence. By feeding the output of the encoder 320 to the encoder-decoder attention neural network 330, the contextual information and relationships captured in the input sequence (by the encoder 320) can be carried to the decoder 340. Such connection enables the decoder 340 to access to the entire input sequence, rather than just the last hidden state. Because the decoder 340 can attend to all words in the input sequence, the input information can be aligned with the generation of output to improve contextual accuracy of the generated text output.

In some examples, one or more of the attention neural networks (e.g., 306, 326, 330) can be configured to implement a single head attention mechanism, by which the model can capture relationships between words in an input sequence by assigning attention weights to each word based on its relevance to a target word. The term "single head" indicates that there is only one set of attention weights or one mechanism for capturing relationships between words in the input sequence. In some examples, one or more of the attention neural networks (e.g., 306, 326, 330) can be configured to implement a multi-head attention mechanism, by which multiple sets of attention weights, or "heads," in parallel to capture different aspects of the input sequence. Each head learns distinct relationships and dependencies within the input sequence. These multiple attention heads can enhance the model's ability to attend to various features and patterns, enabling it to understand complex, multifaceted contexts, thereby leading to more accurate and contextually relevant text generation. The outputs from multiple heads can be concatenated or linearly combined to produce a final attention output.

As depicted in FIG. 3, both the encoder 320 and the decoder 340 can include one or more addition and normalization layers (e.g., the layers 308 and 312 in the encoder 320, the layers 328, 332, and 336 in the decoder 340). The addition layer, also known as a residual connection, can add the output of another layer (e.g., an attention neural network or a feedforward network) to its input. After the addition operation, a normalization operation can be performed by a corresponding normalization layer, which normalizes the features (e.g., making the features to have zero mean and unit variance), This can help in stabilizing the learning process and reducing training time.

A linear layer 342 at the output end of the decoder 340 can transform the output embeddings into the original input space. Specifically, the output embeddings produced by the decoder 340 are forwarded to the linear layer 342, which can transform the high-dimensional output embeddings into a space where each dimension corresponds to a word in the vocabulary of the LLM 300.

The output of the linear layer 342 can be fed to a soft max layer 344, which is configured to implement a soft max function, also known as soft arg max or normalized exponential function, which is a generalization of the logistic function that compresses values into a given range. Specifically, the soft max layer 344 takes the output from the linear layer 342 (also known as logits) and transforms them into probabilities. These probabilities sum up to 1, and each probability corresponds to the likelihood of a particular word being the next word in the sequence. Typically, the word with the highest probability can be selected as the next word in the generated text output.

Still referring to FIG. 3, the general operation process for the LLM 300 to generate a reply or text output in response to a received prompt input is described below.

First, the input text is tokenized, e.g., by the input embedding unit 302, into a sequence of tokens, each representing a word or part of a word. Each token is then mapped to a fixed-length vector or input embedding. Then, positional encoding 304 is added to the input embeddings to retain information regarding the order of words in the input text.

Next, the input embeddings are processed by the self-attention neural network 306 of the encoder 320 to generate a set of hidden states. As described above, multi-head attention mechanism can be used to focus on different parts of the input sequence. The output from the self-attention neural network 306 is added to its input (residual connection) and then normalized at the addition and normalization layer 308.

Then, the feedforward neural network 310 is applied to each token independently. The feedforward neural network 310 includes fully connected layers with non-linear activation functions, allowing the model to capture complex interactions between tokens. The output from the feedforward neural network 310 is added its input (residual connection) and then normalized at the addition and normalization layer 312.

The decoder 340 uses the hidden states from the encoder 320 and its own previous output sequence to generate the next token in an autoregressive manner so that the sequential output is generated by attending to the previously generated tokens. Specifically, the output of the encoder 320 (input embeddings processed by the encoder 320) are fed to the encoder-decoder attention neural network 330 of the decoder 340, which allows the decoder 340 to attend to all words in the input sequence. As described above, the encoder-decoder attention neural network 330 can implement a multi-head attention mechanism, e.g., computing a weighted sum of all the encoded input vectors, with the most relevant vectors being attributed the highest weights.

The previous output sequence of the decoder 340 is first tokenized by the output embedding unit 322 to generate an output embedding for each token in the output sequence. Similarly, positional embedding 324 is added to the output embedding to retain information regarding the order of words in the output sequence.

The output embeddings are processed by the self-attention neural network 326 of the decoder 340 to generate a set of hidden states. The self-attention mechanism allows each token in the text output to attend to all tokens in the input sequence as well as all previous tokens in the output sequence. The output from the self-attention neural network 326 is added to its input (residual connection) and then normalized at the addition and normalization layer 328.

The encoder-decoder attention neural network 330 receives the output embeddings processed through the self-attention neural network 326 and the addition and normalization layer 328. Additionally, the encoder-decoder attention neural network 330 also receives the output from the addition and normalization layer 312 which represents input embeddings processed by the encoder 320. By considering both processed input embeddings and output embeddings, the output of the encoder-decoder attention neural network 330 represents an output embedding which takes into account both the input sequence and the previously generated outputs. As a result, the decoder 340 can generate the output sequence that is contextually aligned with the input sequence.

The output from the encoder-decoder attention neural network 330 is added to part of its input (residual connection), i.e., the output from the addition and normalization layer 328, and then normalized at the addition and normalization layer 332. The normalized output from the addition and normalization layer 332 is then passed through the feedforward neural network 334. The output of the feedforward neural network 334 is then added to its input (residual connection) and then normalized at the addition and normalization layer 336.

The processed output embeddings output by the decoder 340 are passed through the linear layer 342, which maps the high-dimensional output embeddings back to the size of the vocabulary, that is, it transforms the output embeddings into a space where each dimension corresponds to a word in the vocabulary. The soft max layer 344 then converts output of the linear layer 342 into probabilities, each of which corresponds to the likelihood of a particular word being the next word in the sequence. Finally, the LLM 300 samples an output token from the probability distribution generated by the soft max layer 344 (e.g., selecting the token with the highest probability), and this token is added to the sequence of generated tokens for the text output.

The steps described above are repeated for each new token until an end-of-sequence token is generated or a maximum length is reached. Additionally, if the encoder 320 and/or decoder 340 have multiple stacked layers, the steps performed by the encoder 320 and decoder 340 are repeated across each layer in the encoder 320 and the decoder 340 for generation of each new token.

Example Use Case

An example use case is described below to further illustrate the intelligent test data troubleshooting technologies disclosed herein.

In one example, after a user deployed a set of test data onto an application running on SAP S4/HANA ERP system, the application threw an error with the following error message: "Error: Transaction code not found." The user can send the error message to the intelligent troubleshooter 130 for troubling shooting.

In this example, the troubleshooter 130 first embeds the error message into a message vector, e.g., using the embedding engine 132. Next, the similarity analyzer 134 searches the vector database 148 for an object vector that closely matches the message vector. The target object vector, associated with the highest similarity score, is identified. The prompt generator 136 then retrieves, from the text segment database 150, a target text segment corresponding to the target object vector. The troubleshooter 130 can also identify a corresponding target object document which contains this target text segment. The prompt generator 136 then extracts relevant context from the target text segment or the target object document. In this example, the extracted the following context information, which includes both the title and resolution section of an SAP troubleshooting document:

```
Context:
```
Title: Issue with Transaction Code
Solution: Ensure that the transaction code is correctly entered and exists
in the system. If not, check the SAP documentationfor the correct code.
```
Resolution:
```
1. Verify the transaction code is correct.
2. Navigate to SAP GUI and enter the transaction code.
3. If the error persists, refer to SAP documentation for correct codes.
4. Use transaction code SE93 to check if the code exists.
```

Then, the prompt generator 136 generates a prompt using the following prompt template:

```
Prompt_template = """
You are an expert in SAP.
You are provided multiple context items that are related to the prompt you
have to answer.
If the prompt/input is not there in the suggested database, please answer
based on your expertise.
```

```
The answer should be concise and pointwise, providing only the necessary
steps to fix the issue.
Provide full path to resolve the issue and if specific transaction codes
are required, please include them.
Do not mention anything about attached documents or additional
information sources.
"""
{context}
"""
Question: {question}
"""""
```

In this example, the {context} is a placeholder for receiving the extracted context described above, and the {question} is the placeholder for receiving the error message.

After sending the above prompt to the LLM 124, the LLM 124 can generate the following answer which provides step-by-step guidance for the user to modify the test data to resolve the error.

```
To resolve the "Transaction code not found" error, follow these steps:
1. Verify the transaction code is correct.
2. Navigate to SAP GUI and enter the transaction code.
3. If the error persists, refer to SAP documentation for correct codes.
4. Use transaction code SE93 to check if the code exists.
. . .
```

Example Advantages

The technologies described herein offer several technical advantages, particularly through the integration of generative AI with contextually relevant information for troubleshooting test data related errors in ERP applications. In conventional approaches, troubleshooting test data related errors often require domain or functional experts who are familiar with data objects included in the test data and technical implementation of the ERP applications. This dependency on expert knowledge can lead to prolonged resolution times and higher costs due to the need for specialized skills and manual intervention. In contrast, by leveraging generative AI, the disclosed intelligent troubleshooter can autonomously analyze error messages and generate detailed, context-aware troubleshooting steps based on the specific error message and the associated context retrieved from the most relevant technical documents. This approach not only accelerates the resolution process by providing immediate, actionable insights but also minimizes the need for specialized expertise, thus reducing operational costs and improving overall efficiency in handling test data errors.

Additionally, the technologies disclosed herein provide lifecycle management capabilities for the troubleshooter. Specifically, the disclosed vector engine systematically monitors and updates the vector and text segment databases to ensure they reflect the most current and relevant information. Unlike existing troubleshooting approaches that mainly rely on periodic manual updates and often suffer from outdated or irrelevant data, the vector engine can automatically handle updates triggered by changes in technical documents relevant to the test data. By integrating automated data extraction and updating processes, the vector engine ensures that the troubleshooting context is always up to date, thereby enhancing the accuracy of generated troubleshooting steps and reducing the risk of errors caused by stale or inaccurate data.

Example Computing Systems

Figure 4:
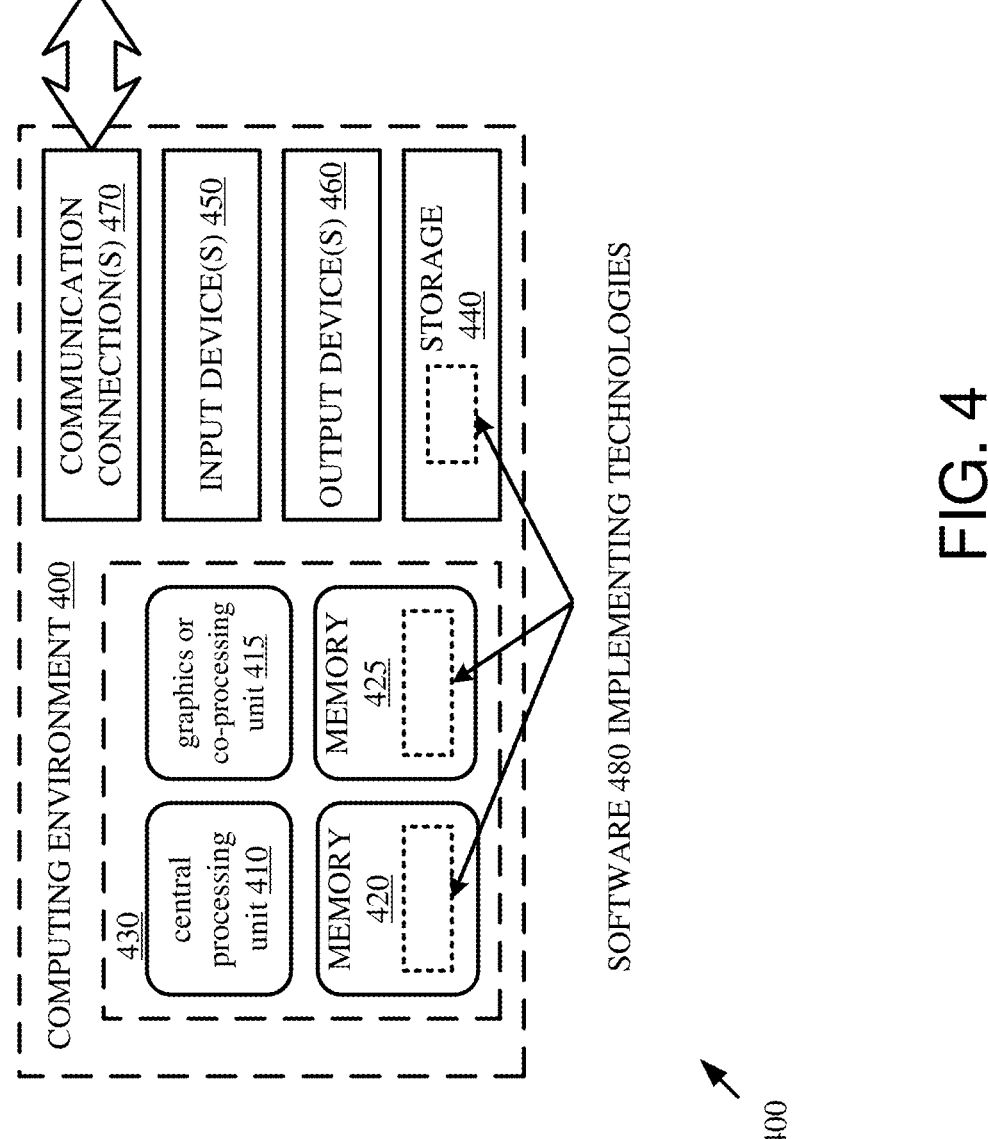
FIG. 4 is a block diagram of an example computing system in which described embodiments can be implemented.

FIG. 4 depicts an example of a suitable computing system 400 in which the described innovations can be implemented. The computing system 400 is not intended to suggest any limitation as to scope of use or functionality of the present disclosure, as the innovations can be implemented in diverse computing systems.

With reference to FIG. 4, the computing system 400 includes one or more processing units 410, 415 and memory 420, 425. In FIG. 4, this basic configuration 430 is included within a dashed line. The processing units 410, 415 can execute computer-executable instructions, such as for implementing the features described in the examples herein (e.g., the method 200). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 4 shows a central processing unit 410 as well as a graphics processing unit or co-processing unit 415. The tangible memory 420, 425 can be volatile memory (e.g., registers, cache, RAM), non-volatile memory (e.g., ROM, EEPROM, flash memory, etc.), or some combination of the two, accessible by the processing unit(s) 410, 415. The memory 420, 425 can store software 480 implementing one or more innovations described herein, in the form of computer-executable instructions suitable for execution by the processing unit(s) 410, 415.

A computing system 400 can have additional features. For example, the computing system 400 can include storage 440, one or more input devices 450, one or more output devices 460, and one or more communication connections 470, including input devices, output devices, and communication connections for interacting with a user. An interconnection mechanism (not shown) such as a bus, controller, or network can interconnect the components of the computing system 400. Typically, operating system software (not shown) can provide an operating environment for other software executing in the computing system 400, and coordinate activities of the components of the computing system 400.

The tangible storage 440 can be removable or non-removable, and includes magnetic disks, magnetic tapes or cassettes, CD-ROMs, DVDs, or any other medium which can be used to store information in a non-transitory way and which can be accessed within the computing system 400. The storage 440 can store instructions for the software implementing one or more innovations described herein.

The input device(s) 450 can be an input device such as a keyboard, mouse, pen, or trackball, a voice input device, a scanning device, touch device (e.g., touchpad, display, or the like) or another device that provides input to the computing system 400. The output device(s) 460 can be a display, printer, speaker, CD-writer, or another device that provides output from the computing system 400.

The communication connection(s) 470 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 5:
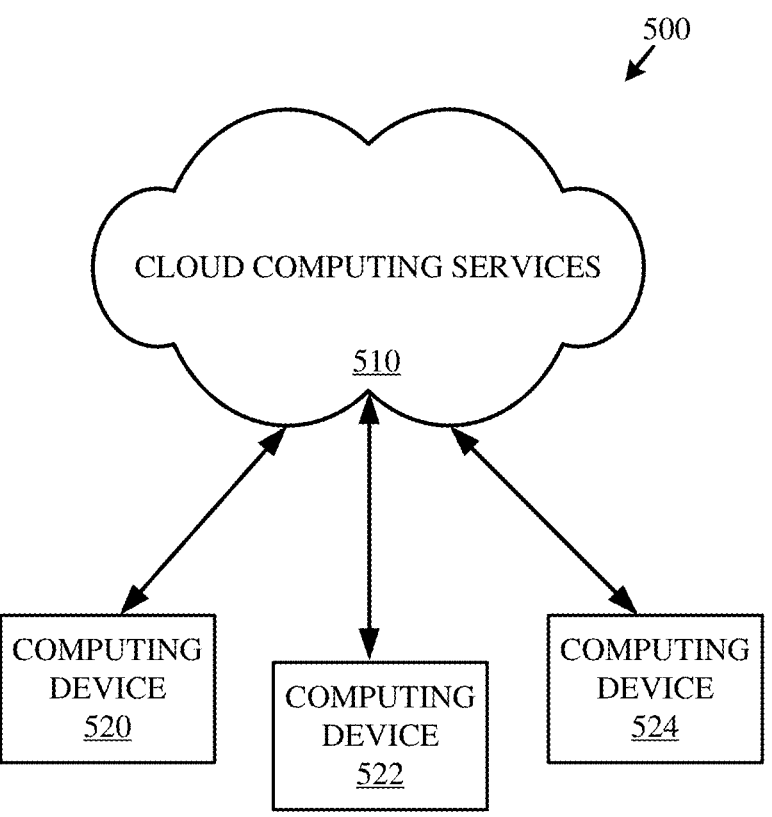
FIG. 5 is a block diagram of an example cloud computing environment that can be used in conjunction with the technologies described herein.

FIG. 5 depicts an example cloud computing environment 500 in which the described technologies can be implemented, including, e.g., the system 100 and other systems herein. The cloud computing environment 500 can include cloud computing services 510. The cloud computing services 510 can comprise various types of cloud computing resources, such as computer servers, data storage repositories, networking resources, etc. The cloud computing services 510 can be centrally located (e.g., provided by a data center of a business or organization) or distributed (e.g., provided by various computing resources located at different locations, such as different data centers and/or located in different cities or countries).

The cloud computing services 510 can be utilized by various types of computing devices (e.g., client computing devices), such as computing devices 520, 522, and 524. For example, the computing devices (e.g., 520, 522, and 524) can be computers (e.g., desktop or laptop computers), mobile devices (e.g., tablet computers or smart phones), or other types of computing devices. For example, the computing devices (e.g., 520, 522, and 524) can utilize the cloud computing services 510 to perform computing operations (e.g., data processing, data storage, and the like).

In practice, cloud-based, on-premises-based, or hybrid scenarios can be supported.

Example Implementations

In any of the examples herein, a software application (or "application") can take the form of a single application or a suite of a plurality of applications, whether offered as a service (SaaS), in the cloud, on premises, on a desktop, mobile device, wearable, or the like.

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Although specific prompt templates are described above, it should be understood that these prompt templates are merely examples for illustration purposes, and different prompt templates can be used based on the principles described herein.

In any of the examples described herein, an operation performed in real time means that the operation can be completed with negligible processing latency (e.g., the operation can be completed within one second or the like).

Example Clauses

Any of the following example clauses can be implemented.

Clause 1. A computing system for improving test data troubleshooting in an enterprise resource planning (ERP) system, the computing system comprising: memory; one or more hardware processors coupled to the memory; and one or more computer readable storage media storing instructions that, when loaded into the memory, cause the one or more hardware processors to perform operations comprising: receiving an error message generated by an application of the ERP system when processing a set of test data; embedding the error message into a message vector; searching a vector database comprising a plurality of object vectors, wherein the searching identifies, among the plurality of object vectors, a target object vector matching the message vector; retrieving a target object document associated with the target object vector, wherein the target object document contains text descriptions of the error message; and generating an answer including instructions to modify the set of test data based on the error message and the target object document.

Clause 2. The computing system of clause 1, wherein searching the vector database comprises measuring similarities between the message vector and the plurality of object vectors.

Clause 3. The computing system of clause 2, wherein searching the vector database further comprises determining a maximum of the measured similarities.

Clause 4. The computing system of any one of clauses 1-3, wherein generating the answer comprises generating a prompt based on a prompt template, wherein the prompt template includes a first placeholder for receiving the error message and a second placeholder for receiving context from the target object document.

Clause 5. The computing system of clause 4, wherein generating the answer further comprises prompting a large language model using the prompt.

Clause 6. The computing system of any one of clauses 1-5, wherein the operations further comprise creating the vector database based on a group of object documents.

Clause 7. The computing system of clause 6, wherein creating the vector database comprises dividing the group of object documents into a plurality of text segments and embedding the plurality of text segments into the plurality of object vectors, respectively.

Clause 8. The computing system of any one of clauses 6-7, wherein creating the vector database comprises filtering a document corpus using a set of rules to identify the group of object documents.

Clause 9. The computing system of any one of clauses 6-8, wherein the operations further comprise periodically detecting whether there is an update to the group of object documents.

Clause 10. The computing system of clause 9, wherein the operations further comprise updating the vector database responsive to detecting that the group of object documents have had the update.

Clause 11. A computer-implemented method for improving test data troubleshooting in an enterprise resource planning (ERP) system, the method comprising: receiving an error message generated by an application of the ERP system when processing a set of test data; embedding the error message into a message vector; searching a vector database comprising a plurality of object vectors, wherein the searching identifies, among the plurality of object vectors, a target object vector matching the message vector; retrieving a target object document associated with the target object vector, wherein the target object document contains text descriptions of the error message; and generating an answer including instructions to modify the set of test data based on the error message and the target object document.

Clause 12. The computer-implemented method of clause 11, wherein searching the vector database comprises measuring similarities between the message vector and the plurality of object vectors.

Clause 13. The computer-implemented method of clause 12, wherein searching the vector database further comprises determining a maximum of the measured similarities.

Clause 14. The computer-implemented method of any one of clauses 11-13, wherein generating the answer comprises generating a prompt based on a prompt template, wherein the prompt template includes a first placeholder for receiving the error message and a second placeholder for receiving context from the target object document, and prompting a large language model using the prompt.

Clause 15. The computer-implemented method of any one of clauses 11-14, further comprising creating the vector database based on a group of object documents.

Clause 16. The computer-implemented method of clause 15, wherein creating the vector database comprises dividing the group of object documents into a plurality of text segments and embedding the plurality of text segments into the plurality of object vectors, respectively.

Clause 17. The computer-implemented method of any one of clauses 15-16, wherein creating the vector database comprises filtering a document corpus using a set of rules to identify the group of object documents.

Clause 18. The computer-implemented method of any one of clauses 15-17, further comprising periodically detecting whether there is an update to the group of object documents.

Clause 19. The computer-implemented method of clause 18, further comprising updating the vector database responsive to detecting that the group of object documents have had the update.

Clause 20. One or more non-transitory computer-readable media having encoded thereon computer-executable instructions causing one or more processors to perform a method for improving test data troubleshooting in an enterprise resource planning (ERP) system, the method comprising: receiving an error message generated by an application of the ERP system when processing a set of test data; embedding the error message into a message vector; searching a vector database comprising a plurality of object vectors, wherein the searching identifies, among the plurality of object vectors, a target object vector matching the message vector; retrieving a target object document associated with the target object vector, wherein the target object document contains text descriptions of the error message; and generating an answer including instructions to modify the set of test data based on the error message and the target object document.

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system for improving real-time test data troubleshooting in an enterprise resource planning (ERP) system, the computing system comprising:
  memory;
  one or more hardware processors coupled to the memory; and
  one or more computer readable storage media storing instructions that, when loaded into the memory, cause the one or more hardware processors to perform operations comprising:
  receiving an error message generated by an application of the ERP system when processing a set of test data;
  embedding, by an embedding engine using an embedding model, the error message into a message vector;
  searching, by a similarity analyzer, a vector database comprising a plurality of object vectors generated from text segments of object documents extracted from a document corpus, wherein the searching identifies, among the plurality of object vectors, a target object vector matching the message vector;

retrieving, from a text segment database, a target text segment corresponding to the target object vector;
identifying a target object document containing the target text segment, wherein the target object document contains text descriptions of the error message; and
generating an answer including instructions to modify the set of test data to resolve one or more errors corresponding to the error message, based on the error message and the target object document, wherein generating the answer comprises:
  generating a prompt based on a prompt template including a first placeholder for receiving the error message and a second placeholder for receiving context from the target object document;
  sending the prompt to a large language model;
  receiving, from the large language model, a reply including step-by-step guidance for troubleshooting the set of test data to resolve the one or more errors; and
  presenting the reply on a user interface as the answer.

2. The computing system of claim 1, wherein searching the vector database comprises measuring similarities between the message vector and the plurality of object vectors.

3. The computing system of claim 2, wherein searching the vector database further comprises determining a maximum of the measured similarities.

4. The computing system of claim 1, wherein the operations further comprise creating the vector database based on a group of object documents.

5. The computing system of claim 4, wherein creating the vector database comprises dividing the group of object documents into a plurality of text segments and embedding the plurality of text segments into the plurality of object vectors, respectively.

6. The computing system of claim 4, wherein creating the vector database comprises filtering a document corpus using a set of rules to identify the group of object documents.

7. The computing system of claim 4, wherein the operations further comprise periodically detecting whether there is an update to the group of object documents.

8. The computing system of claim 7, wherein the operations further comprise updating the vector database responsive to detecting that the group of object documents have had the update.

9. A computer-implemented method for improving real-time test data troubleshooting in an enterprise resource planning (ERP) system, the method comprising:
  receiving an error message generated by an application of the ERP system when processing a set of test data;
  embedding, by an embedding engine using an embedding model the error message into a message vector;
  searching, by a similarity analyzer, a vector database comprising a plurality of object vectors generated from text segments of object documents extracted from a document corpus, wherein the searching identifies, among the plurality of object vectors, a target object vector matching the message vector;
  retrieving, from a text segment database, a target text segment corresponding to the target object vector;
  identifying a target object document containing the target text segment, wherein the target object document contains text descriptions of the error message; and
  generating an answer including instructions to modify the set of test data to resolve one or more errors corresponding to the error message, based on the error message and the target object document, wherein generating the answer comprises:

generating a prompt based on a prompt template including a first placeholder for receiving the error message and a second placeholder for receiving context from the target object document;

sending the prompt to a large language model;

receiving, from the large language model, a reply including step-by-step guidance for troubleshooting the set of test data to resolve the one or more errors; and presenting the reply on a user interface as the answer.

10. The computer-implemented method of claim 9, wherein searching the vector database comprises measuring similarities between the message vector and the plurality of object vectors.

11. The computer-implemented method of claim 10, wherein searching the vector database further comprises determining a maximum of the measured similarities.

12. The computer-implemented method of claim 9, further comprising creating the vector database based on a group of object documents.

13. The computer-implemented method of claim 12, wherein creating the vector database comprises dividing the group of object documents into a plurality of text segments and embedding the plurality of text segments into the plurality of object vectors, respectively.

14. The computer-implemented method of claim 12, wherein creating the vector database comprises filtering a document corpus using a set of rules to identify the group of object documents.

15. The computer-implemented method of claim 12, further comprising periodically detecting whether there is an update to the group of object documents.

16. The computer-implemented method of claim 15, further comprising updating the vector database responsive to detecting that the group of object documents have had the update.

17. One or more non-transitory computer-readable media having encoded thereon computer-executable instructions causing one or more processors to perform a method for improving real-time test data troubleshooting in an enterprise resource planning (ERP) system, the method comprising:

receiving an error message generated by an application of the ERP system when processing a set of test data;

embedding, by an embedding engine using an embedding model, the error message into a message vector;

searching, by a similarity analyzer, a vector database comprising a plurality of object vectors generated from text segments of object documents extracted from a document corpus, wherein the searching identifies, among the plurality of object vectors, a target object vector matching the message vector;

retrieving, from a text segment database, a target text segment corresponding to the target object vector;

identifying a target object document containing the target text segment, wherein the target object document contains text descriptions of the error message; and generating an answer including instructions to modify the set of test data to resolve one or more errors corresponding to the error message, based on the error message and the target object document, wherein generating the answer comprises:

generating a prompt based on a prompt template including a first placeholder for receiving the error message and a second placeholder for receiving context from the target object document;

sending the prompt to a large language model;

receiving, from the large language model, a reply including step-by-step guidance for troubleshooting the set of test data to resolve the one or more errors; and presenting the reply on a user interface as the answer.

\* \* \* \* \*